US009616780B2

(12) United States Patent
Gallienne et al.

(10) Patent No.: US 9,616,780 B2
(45) Date of Patent: Apr. 11, 2017

(54) DEVICE FOR ADJUSTING THE TILT OF A VEHICLE SEAT BY SMALLER INCREMENTS

(71) Applicant: Faurecia Sièges d'Automobile, Nanterre (FR)

(72) Inventors: Didier Gallienne, Landigou (FR); Damien Grimaud, Caligny (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 14/852,416

(22) Filed: Sep. 11, 2015

(65) Prior Publication Data
US 2016/0075261 A1    Mar. 17, 2016

(30) Foreign Application Priority Data
Sep. 12, 2014 (FR) ...................................... 14 58572

(51) Int. Cl.
  *B60N 2/22* (2006.01)
  *B60N 2/235* (2006.01)
  *B60N 2/44* (2006.01)

(52) U.S. Cl.
CPC ......... *B60N 2/2362* (2015.04); *B60N 2/2356* (2013.01); *B60N 2/4435* (2013.01); *B60N 2002/4455* (2013.01); *B60N 2205/20* (2013.01)

(58) Field of Classification Search
CPC ... B60N 2/2362; B60N 2/2356; B60N 2/4435
USPC ........................................... 297/367 P, 367 L
See application file for complete search history.

(56) References Cited

U.S. PATENT DOCUMENTS

| 6,883,869 | B2 | 4/2005 | Liu et al. | |
|---|---|---|---|---|
| 7,828,386 | B2 * | 11/2010 | Reubeuze | B60N 2/2358 297/367 P |
| 8,985,689 | B2 * | 3/2015 | McCulloch | A47C 1/026 297/367 P |
| 2006/0022503 | A1 * | 2/2006 | Reubeuze | B60N 2/2358 297/378.12 |
| 2007/0040435 | A1 | 2/2007 | Oki | |
| 2009/0066138 | A1 | 3/2009 | Reubeuze et al. | |

(Continued)

FOREIGN PATENT DOCUMENTS

| DE | 102005026966 B3 | 12/2006 |
|---|---|---|
| FR | 2920713 A1 | 3/2009 |
| WO | 2004080748 A2 | 9/2004 |

OTHER PUBLICATIONS

Search Report and written opinion corresponding to application No. FR 1458572, dated Apr. 21, 2015.

*Primary Examiner* — Rodney B White
(74) *Attorney, Agent, or Firm* — Reising Ethington P.C.

(57) ABSTRACT

A hinge mechanism for a vehicle seat, allowing adjustment of the tilt of a seat backrest relative to a seat cushion. The hinge mechanism has two plates, the first plate containing base gear teeth on an edge directed inward, a set of first elements cooperating with a first control cam biased by first springs, a set of second elements cooperating with a second control cam biased by second springs, and a control hub for moving the control cams toward an unlocking position against the biasing of the first and second springs. The set of first elements have teeth offset angularly by at most a half-tooth relative to teeth of the set of second elements, thereby obtaining a small locking pitch.

16 Claims, 10 Drawing Sheets

(56) References Cited

U.S. PATENT DOCUMENTS

2011/0254338 A1* 10/2011 Fisher, III .............. B60N 2/236
  297/367 P
2014/0159458 A1 6/2014 Lu et al.
2015/0321585 A1* 11/2015 McCulloch .......... B60N 2/2356
  297/367 P

* cited by examiner

DEVICE FOR ADJUSTING THE TILT OF A VEHICLE SEAT BY SMALLER INCREMENTS

TECHNICAL FIELD

The present invention relates to hinge mechanisms and tilt adjustment devices for a vehicle seat, and in particular concerns incrementally adjustable hinges for backrests.

More specifically, the invention relates to a mechanism of a motor vehicle seat, allowing adjustment of the tilt of a seat backrest relative to a seat cushion about a main hinge axis, comprising first and second hinge plates intended to be rigidly connected to said backrest and seat cushion respectively, the first plate comprising base gear teeth on a circular edge directed radially inward, having N teeth spaced regularly apart at a basic angular pitch of 360/N degrees. Such a hinge mechanism further comprises locking elements with teeth that are movable and guided relative to the second plate in a radial movement, between an engaged position where the teeth of the elements are engaged with the facing teeth of the first plate, and a disengaged position where there is no mutual engagement of the teeth. A control cam associated with a control plate allows radially moving the locking elements between these two positions. This provides a hinge mechanism which can be locked in one of the possible locking positions, the various possible positions being separated by an angular distance (also called the "locking pitch") of 360/N degrees. In the prior art, the number of teeth of the first plate is between 100 and 200, which corresponds to a locking pitch of between 3.6 degrees and 1.8 degrees.

BACKGROUND

Such a seat hinge mechanism is known, for example from document FR2977204.

It is desirable to be able to reduce the locking pitch in order to provide an increased number of possible tilt adjustment positions, improving the comfort for seat occupants; in particular, we want to obtain a locking pitch of less than 1.5 degrees or preferably less than 1 degree.

The teeth of these elements usually have a generally triangular profile.

The solution that consists of increasing the number of teeth faces a basic problem of geometry, because as the number of teeth increases the depth of the teeth decreases and therefore the depth of the engagement decreases as well. However, safety requirements call for maintaining the seat position during a collision involving the vehicle, which implies a relatively extensive engagement between the teeth of the movable elements and the base gear teeth of the plate, in order to guarantee robustness during a collision.

There is therefore a need for a solution that provides a smaller locking pitch while continuing to meet safety requirements concerning the hinge mechanism between the backrest and seat cushion.

SUMMARY

To this end, according to an aspect of the invention, there is provided a seat hinge mechanism allowing adjustment of the tilt of a seat backrest relative to a seat cushion about a hinge axis, the hinge mechanism comprising:

first and second hinge plates intended to be rigidly connected to said backrest and seat cushion respectively, the first plate comprising base gear teeth on an edge directed radially inward, having N teeth spaced regularly apart at an angular pitch of 360/N degrees, a set of P subsets of toothed elements, including at least:
  a first subset of one or more first elements cooperating with a first control cam biased by one or more first springs,
  a second subset of one or more second elements cooperating with a second control cam biased by one or more second springs, and
a control hub adapted to move the first and second control cams toward an unlocking position, while the first and second springs independently bias the first and second cams toward a locking position,
the first and second elements being movable at least radially, guided by guides formed in the second plate and comprising teeth for engaging with the base gear teeth, the first and second elements being movable between an engaged position where the teeth of the elements are engaged with the facing base gear teeth, and a disengaged position where there is no mutual engagement of the teeth,
wherein the teeth of the first element(s) are offset angularly about the axis, relative to the teeth of the second element(s), by an offset substantially equal to (K+1/P) 360/N degrees, where K is an integer.

In this manner, only one of the subsets of elements is in a fully engaged position while the elements of the other subsets are in a partially engaged or tooth-on-tooth position, and thus one can obtain a locking pitch divided by P relative to the pitch of the base gear teeth, in the current case less than 1.5 degrees or preferably even less than 1 degree.

This makes the seat more comfortable for users as it provides smaller increments for the adjustments and settings.

It is understood that if the element or elements of a first subset is in its engaged position, and it is desired to change the position of the backrest by an angle corresponding to less than one tooth of the base gear teeth, then it is the element or elements of a second subset which will come into the fully engaged position, while the elements of the first subset will be partially engaged or tooth on tooth.

In various embodiments of the invention, one or more of the following arrangements may possibly be used.

The control hub may be biased toward a rest position by one or more third spring(s). The control hub, and optionally the connecting rod and the user control handle, are thus, in the absence of user-applied force, biased to a rest position independently of the action of the first and second springs; in this manner the biasing of the first and second cams can be decoupled from the biasing means for the control hub, which ensures that the elements are properly relocked.

According to one advantageous option, the first, second, and third springs may be identical, arranged in the same plane at the same axial position, and distributed every 60° about the axis. This optimizes the axial compactness of the hinge mechanism, because the three biasing functions are housed in a smaller axial space.

When P=2 is chosen, the first set of elements may then advantageously include three elements spaced 120° apart from one another; the locking points are then evenly distributed around the base gear teeth and the locking strength is sufficient to meet safety specifications. In other words, this is equivalent to splitting the set of locking elements with a half-tooth offset, doubling the number of possible positions. This makes the seat more comfortable for users as it provides smaller increments for adjustments and settings.

Similarly, the second set of elements may advantageously comprise three elements spaced 120° apart from one another.

The first and second elements may advantageously be arranged in the same plane at the same axial position, such that they alternate along the base gear teeth; thereby obtaining an axial compactness equivalent to a system with a single set of elements;

The first elements are similar to the second elements, except for the teeth of the first elements which are offset by a half-tooth relative to the teeth of the second elements; the offset is obtained by a variation in the local arrangement of teeth on the elements, while the second plate can provide six similar guides regularly arranged every 60°.

N can preferably be chosen as a multiple of 6. In this manner, a repeating pattern every 60° is provided in the base gear teeth, which simplifies the design of the second plate where the six guides are identical and regularly arranged every 60°.

According to one advantageous option, each of the first and second control cams may comprise an annular main body and a plurality of radial push tabs, preferably three in number, the radial push tabs of the first and second cams being arranged in the same plane at the same axial position as the locking elements, while the annular main body of the first cam is offset axially from the annular main body of the second cam. Said annular bodies of the cams are thus arranged one after the other in the axial direction, while all the push tabs are in the same position axially; thereby cleverly housing the two control cams, which remain independent of one another, within a small space.

According to one advantageous option, there are two diametrically opposite first springs, two second springs arranged 120 degrees from each other, and two third springs arranged 120 degrees from each other, the six springs being arranged in six similar recesses formed in the second plate and evenly spaced about the axis. In this manner we simplify the process for obtaining the second plate, where six similar recesses are formed for housing the springs regardless of their destination.

According to another embodiment, one can select P=5 subsets each comprising one toothed element, the teeth of two consecutive toothed elements being offset by an angular distance of 72 degrees and N not being a multiple of 5. An adjustment pitch can thus be obtained that is five times smaller than the pitch of the base gear teeth.

Advantageously, the control cams are metal wedges guided in a tangential motion and biased by compression coil springs; this forms a compact solution for the control cams;

Advantageously, the metal wedges are arranged in a same plane at the same axial position, the compression coil springs also preferably being arranged in the same plane. In this manner the footprint of such a hinge mechanism can be similar to hinge mechanisms of the prior art.

Advantageously, the control hub can be a plastic control plate comprising axially protruding lugs configured to push the wedges when the control plate is rotating toward an unlocking position; the control hub is therefore made of one plastic molded piece.

According to another embodiment, one can select P=3 subsets, each comprising two toothed elements. One can thus divide the locking pitch by three relative to the pitch of the base gear teeth, while still having two fully engaged toothed elements.

According to one advantageous option, each of the first and second control cams comprises a return lug which comes to bear on the free end of the corresponding return spring and at least one driving notch designed to cooperate with at least one finger of the control hub. Thus the control and return functions use shapes integral to each of the control cams.

According to one advantageous option, the control cams are made of metal and are controlled by a plastic control plate, said control plate pulling the locking elements inwardly by acting on pins projecting axially from each of the locking elements. This optimizes the means for controlling the toothed locking elements.

An angular clearance ($\theta$) may be provided between the rest position ($\alpha 0$) of the control hub and the actuating position of each of the control cams ($\alpha 1$, $\alpha 2$), this angular clearance being greater than 3°. The rest position is thus well separated angularly from the actuating positions of the first and second cams.

Finally, the invention also relates to a vehicle seat comprising a seat cushion, a backrest, and at least one hinge mechanism as described above.

BRIEF DESCRIPTION OF THE DRAWINGS

The invention will be better understood and other features and advantages will become apparent upon reading the following detailed description which includes embodiments given for illustrative purposes with reference to the accompanying figures, provided by way of non-limiting examples, which serve to further the understanding of the invention and of the description of its implementation and, where appropriate, contribute to its definition, in which:

FIG. 12 shows a partial perspective view of the hinge mechanism, FIG. 13 is an axial sectional view of the hinge mechanism, FIG. 14 shows another partial perspective view of the hinge mechanism, and FIG. 15 shows a perspective view of the control plate.

DETAILED DESCRIPTION OF THE ILLUSTRATED EMBODIMENTS

Figure 1:
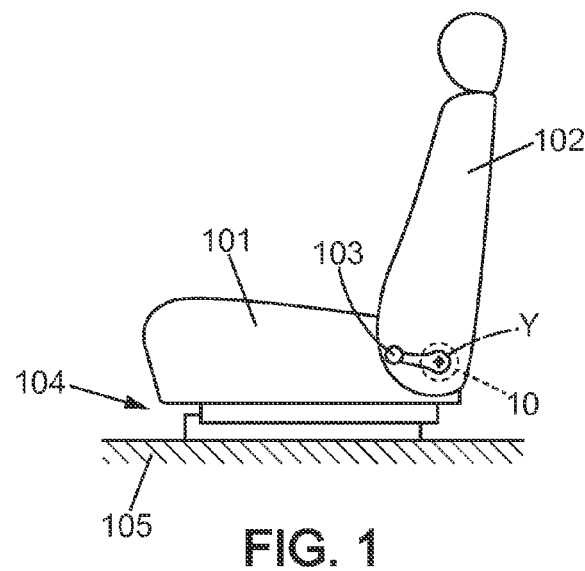
FIG. 1 is a general view of a vehicle seat equipped with a hinge mechanism according to the invention.

FIG. 1 shows a motor vehicle seat 100 having a backrest 102 which is pivotably mounted on a seat cushion 101 so as to pivot about a transverse horizontal pivot axis Y, also called the hinge axis, the seat cushion 101 being mounted on the floor 105 of the vehicle possibly by means of longitudinal sliding tracks 104. In addition, a control handle 103 is provided in the hinge mechanism area, which allows a user to adjust the tilt angle of the backrest relative to the seat cushion.

Figure 2:
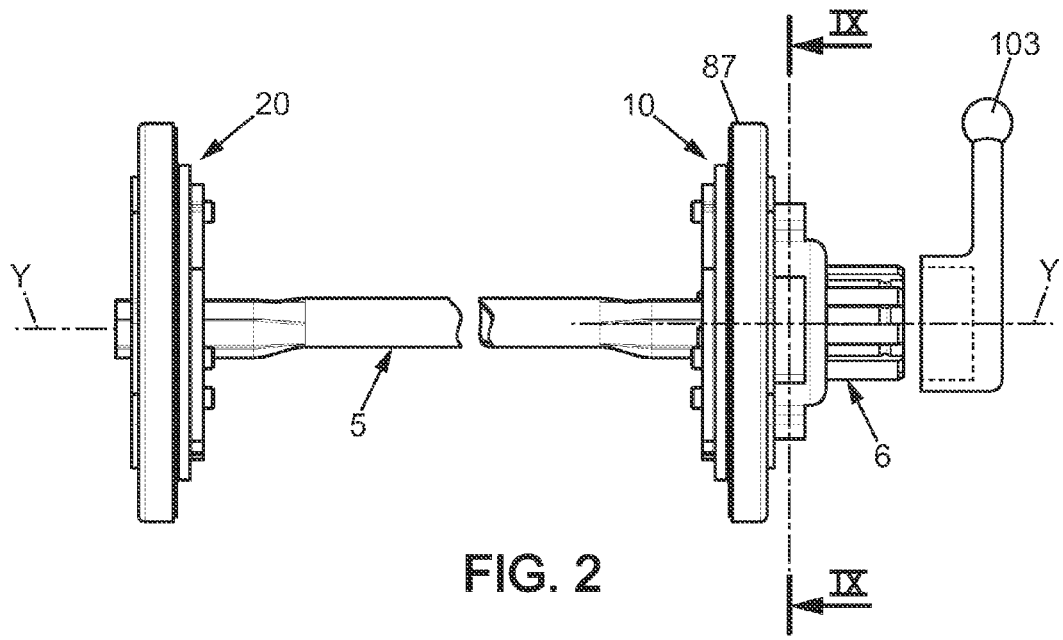
FIG. 2 is a front view of a tilt adjustment device used in the seat of FIG. 1, comprising first and second hinge mechanisms.

The pivoting of the backrest 102 is possible due to a tilt adjustment device, represented in FIG. 2, comprising a first hinge mechanism 10 on the left side of the seat, and a second hinge mechanism 20, optional according to the invention, on the right side of the seat, actuated synchronously by the control handle 103 located on the left side or by any other actuating means (for example an 'easy entry' control providing access to the rear seats of a three-door vehicle).

These first and second hinge mechanisms 10,20 are adapted to prevent pivoting of the backrest 102 relative to the seat 101 in the normal usage position, and are also adapted to allow rotational movement of the backrest when the user applies force to the control handle 103.

It should be noted that the first hinge mechanism 10, and the second hinge mechanism 20 if there is one, can be used to connect any seat member to another seat member and not necessarily the seat cushion and backrest. Note that FIGS. 1 and 2 are common to both embodiments illustrated in the following figures.

As represented in FIGS. 3 to 9 which relate to the first embodiment, the first hinge mechanism 10 comprises first and second metal plates 7,8 respectively attached to the structural frame of the seat cushion and to the structural frame of the backrest (the opposite is of course possible). These two plates 7,8 have a general disc shape and are connected together by a crimped external metal ring 87, thereby defining an interior space containing a locking device which will be detailed below.

By convention, the first plate 7 can be called the "movable" plate and the second plate 8 the "fixed" plate; however, the first plate may be integrally connected to either the backrest or the seat cushion, and conversely the second plate may be integrally connected to either the seat cushion or the backrest.

The locking device comprises a plurality of movable locking elements 21,22 made of metal, each provided with external teeth 27,28 along a circular arc and a maneuvering pin 59.

The first plate 7 has a peripheral annular area, also referred to as the edge 70, having a toothed surface 71 facing radially inward and positioned facing the external teeth 27,28 of the locking elements 21,22. This toothed surface 71 is circular and is referred to as the "base gear teeth" in this document.

The base gear teeth comprise N teeth regularly spaced at intervals of 360/N degrees.

Preferably, N will be chosen as a multiple of 6, so as to have a repeating pattern on the base gear teeth every 60°. In the illustrated example, N is 192, but N could be a different value, for example 186, 180, 174, 168, or 198 or some other value.

Advantageously, there are two sets of locking elements (also called locking "pieces" or "pawls"), a first set of first elements denoted 21 and a second set of second elements denoted 22. More generally, a set of P subsets of toothed elements is defined, each subset comprising one or more toothed elements, the concept of a subset corresponding to the ability of all toothed elements in this subset to be engaged simultaneously with the base gear teeth. For the current case, in this first embodiment we have P=2, and three toothed elements in each of the two subsets. The first subset comprises three first elements, the second subset comprises three second elements.

Each locking element 21,22 is movable radially within guides 14 that are part of the second plate 8, between an engaged position where the teeth 27,28 of the locking element engage said base gear teeth 71 (elements 22, FIG. 8) and a disengaged position (FIG. 10) where the locking element 21,22 is moved radially inwardly so that its teeth 27,28 do not engage the base gear teeth 71, thereby releasing the second plate 8 to rotate freely relative to the first plate 7. In the example, the guides 14 surround the elements and their edges 14a define a purely radial translation, but it is not excluded to have the guiding be angled relative to the radial direction.

The first hinge mechanism 10 further comprises a control hub 1 mounted so as to pivot about the Y axis and adapted to cause movement of the locking elements 21,22 between their engaged position and their disengaged position.

This control hub 1 is integrally associated with a control plate 9 (also called the "control mask") and cooperates with two control cams 31,32 as will be detailed below.

The first control cam 31 cooperates with the first locking elements 21 by means of radial push tabs 81 which form a ramp at their external peripheral edge that pushes the engaged elements outward.

In the example illustrated, there are three first locking elements 21 arranged 120° apart from one another, and there are also three adjacent radial push tabs 81 of the first control cam 31.

Similarly, the second control cam 32 cooperates with the second locking elements 22 by means of radial push tabs 82 which form a ramp at their external peripheral edge.

In the illustrated example, there are three second locking elements 22 arranged 120° apart from one another, offset by 60° relative to the first locking elements 21, and there are also three adjacent radial push tabs 82 of the second control cam 32.

Advantageously, the three first locking elements 21 and the three second locking elements 22 are arranged in the same plane at the same axial position, alternating along the base gear teeth (FIG. 5), or in other words with a element every 60°.

The first three locking elements 21 are identical to each other and have a set of teeth denoted 27; the three second elements 22 are identical to each other and have a set of teeth denoted 28.

Advantageously, the teeth 27 of the first set of elements are angularly offset about the axis relative to the teeth 28 of the second set of elements, by an offset of (K+0.5)360/N, where K is an integer, in other words an offset of a half-tooth. The first set of elements and the second set of elements therefore cannot be engaged at the same time: it will be one or the other.

It should be noted here that the half-tooth offset could be achieved in an alternative solution by a slight offset (½ tooth) of the three guides 14 guiding the second elements, relative to the three guides guiding the first elements, with strictly identical elements.

The first control cam 31 is biased toward a position, referred to as the locking position, which by camming action causes the teeth 27 of the first elements to engage with the base gear teeth 71, this biasing being provided by two first springs 41 arranged in wells or recesses 94 of the second plate 8.

Similarly, the second control cam 32 is biased toward a locking position, which by camming action causes the teeth 28 of the second elements to engage with the base gear teeth 71, this biasing being provided by two second springs 42 arranged in two other wells 94 of the second plate. It should be noted that the biasing of the first and second cams is provided independently by said first and second springs 41,42.

The first control cam 31 is a stamped metal part, and comprises an annular main body 35 from which said radial push tabs 81 extend radially, two return lugs 51 extending axially from the base of the two radial push tabs, and 3 driving notches 37 formed on the radially inner face of the main body.

Similarly, the second control cam 32 is a stamped metal part, and comprises an annular main body 36 from which said radial push tabs 82 extend radially, two return lugs 52 extending axially from the base of the two radial push tabs 82, and 3 driving notches 38 formed on the radially inner face of the main body.

The control hub 1, made of plastic, comprises a cylindrical section 16 received in a bearing 80 of the second plate, a flange 17, and three driving fingers 19 for driving the two cams and the control plate; in addition, there are two diametrically opposed biasing lugs 53 which extend outwardly from the flange but are thicker; the control hub 1 is resiliently biased by a pair of third springs 40 towards a rest position, also called the neutral position, these third springs pressing against said biasing pins 53.

Figure 5:
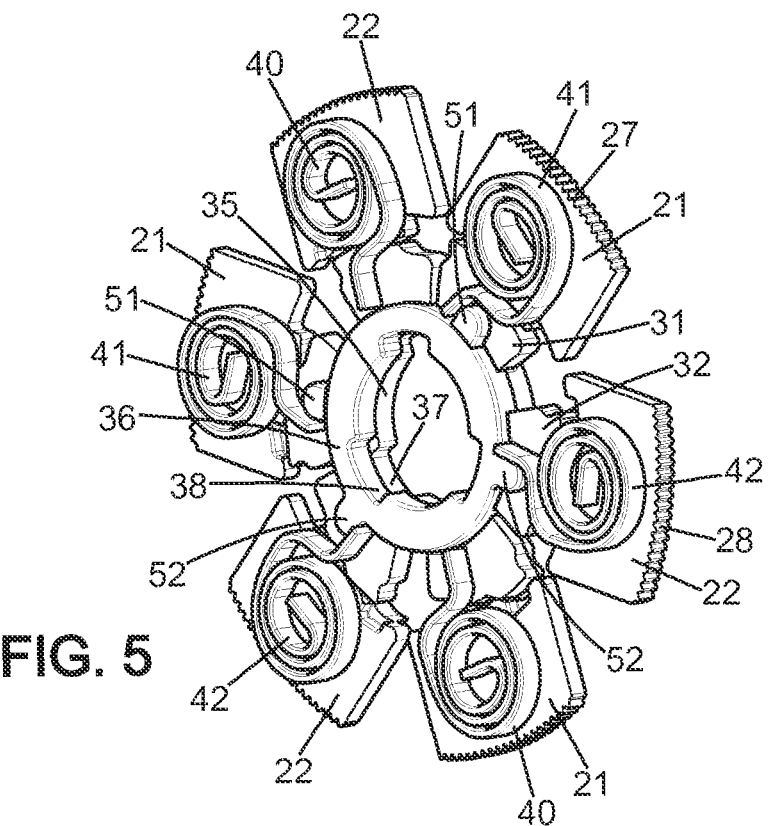
FIG. 5 shows more details in a perspective view of the two sets of locking elements, the two control cams, and the various return springs, according to the first embodiment.
Figure 6:
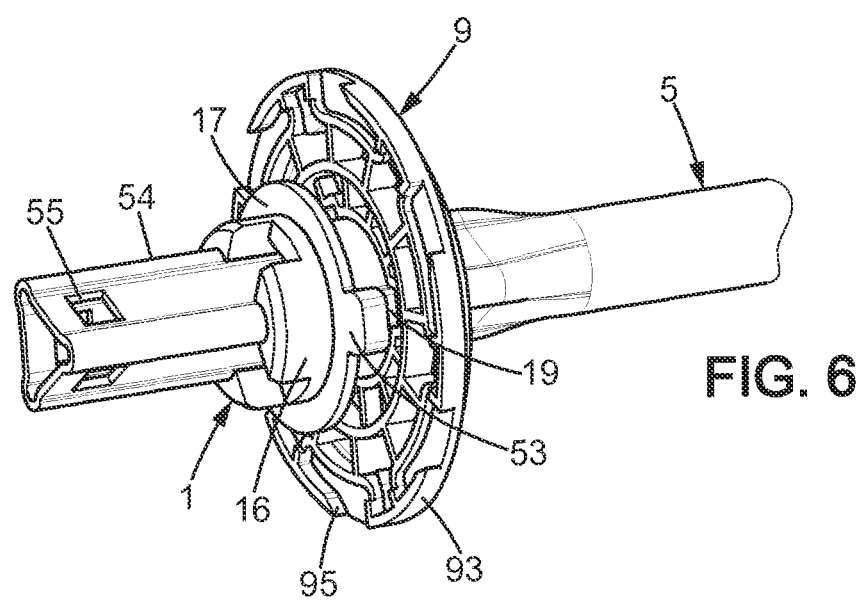
FIG. 6 shows a perspective view of a control plate associated with the control hub, according to the first embodiment.
Figure 7:
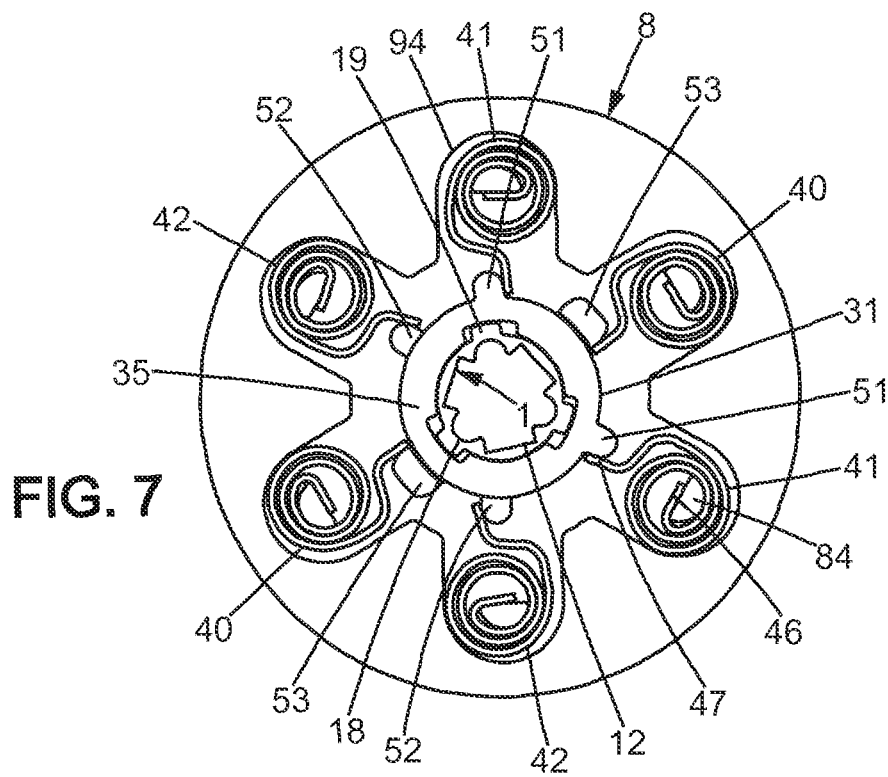
FIG. 7 is a partial cross-sectional view of the hinge mechanism in the locked position, along line VII-VII of FIG. 4.

As illustrated in FIG. 5, the first, second, and third springs 41,42,40 are preferably identical, arranged in the same plane at the same axial position and distributed every 60° about the axis.

Each spring is a spiral spring and comprises a first end 46 anchored on a semi-circular pin 84 of the first plate, and a second end 47 slidingly supported respectively on a lug 51 that is part of the first cam 31, a lug 52 that is part of the second cam 32, or a lug 53 that is part of the control hub 1.

In the illustrated example, there are two first springs 41, but there could be one or three, and similarly there are two second springs 42 represented, but there could be one or three.

Figure 11:
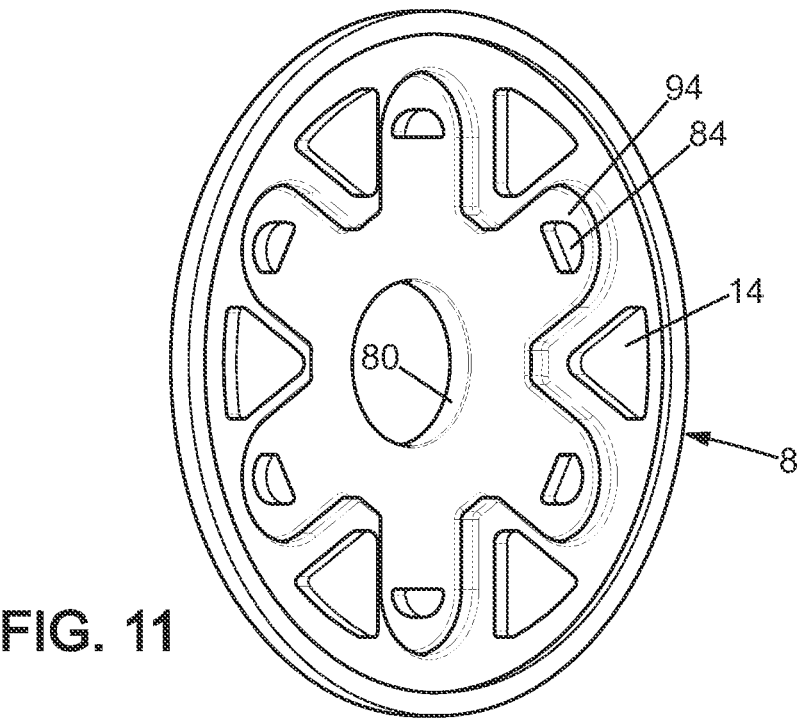
FIG. 11 shows the second hinge plate, still according to the first embodiment.

Each spring is housed in an individual recess 94. In the example illustrated (FIG. 11) each well is positioned between two element guides 14 shaped in the second plate 8.

Figure 10:
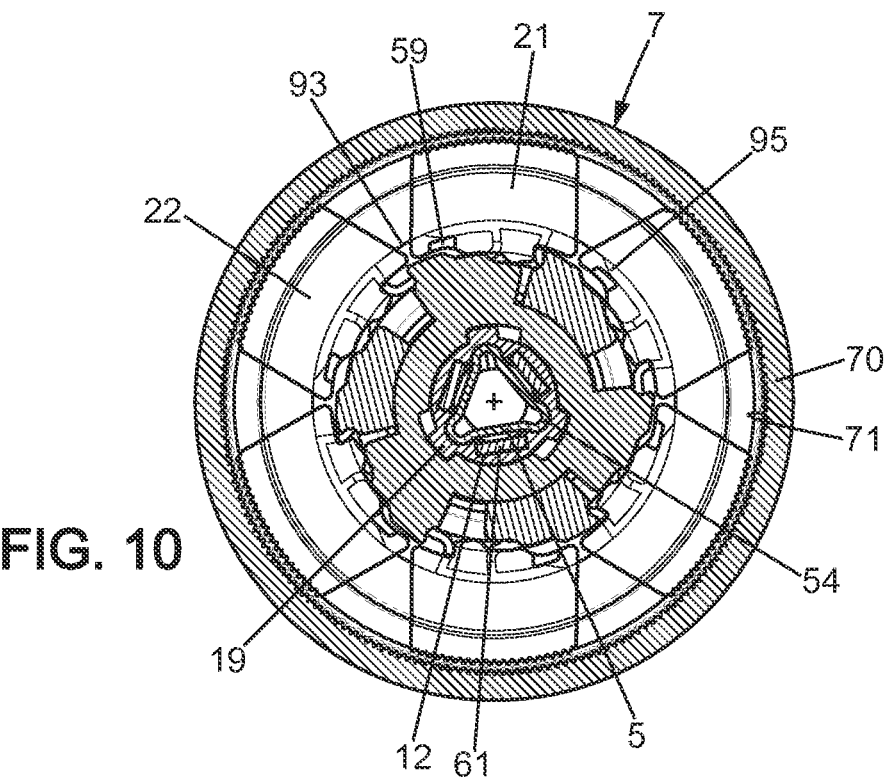
FIG. 10 is a partial cross-sectional view of the hinge mechanism in the unlocked position, still according to the first embodiment.

The control hub 1, also referred to as the inner hub, is supplemented by an outer hub 6. The control hub 1 can be rotated by actuation of the handle 103, via the outer hub 6, into an unlocking position where the control plate 9 causes the locking elements 21,22 to move radially inward to an unlocked position (FIG. 10).

The control plate 9 is preferably made of plastic. It is in the form of a disc with a central axial opening 92, with driving notches 99 (receiving the fingers 19 of the inner hub 1) and ramp-shaped 95 peripheral edges 93, adapted to engage by camming action with the maneuvering pins 59 of the locking elements 21,22 (FIG. 10).

Figure 3:
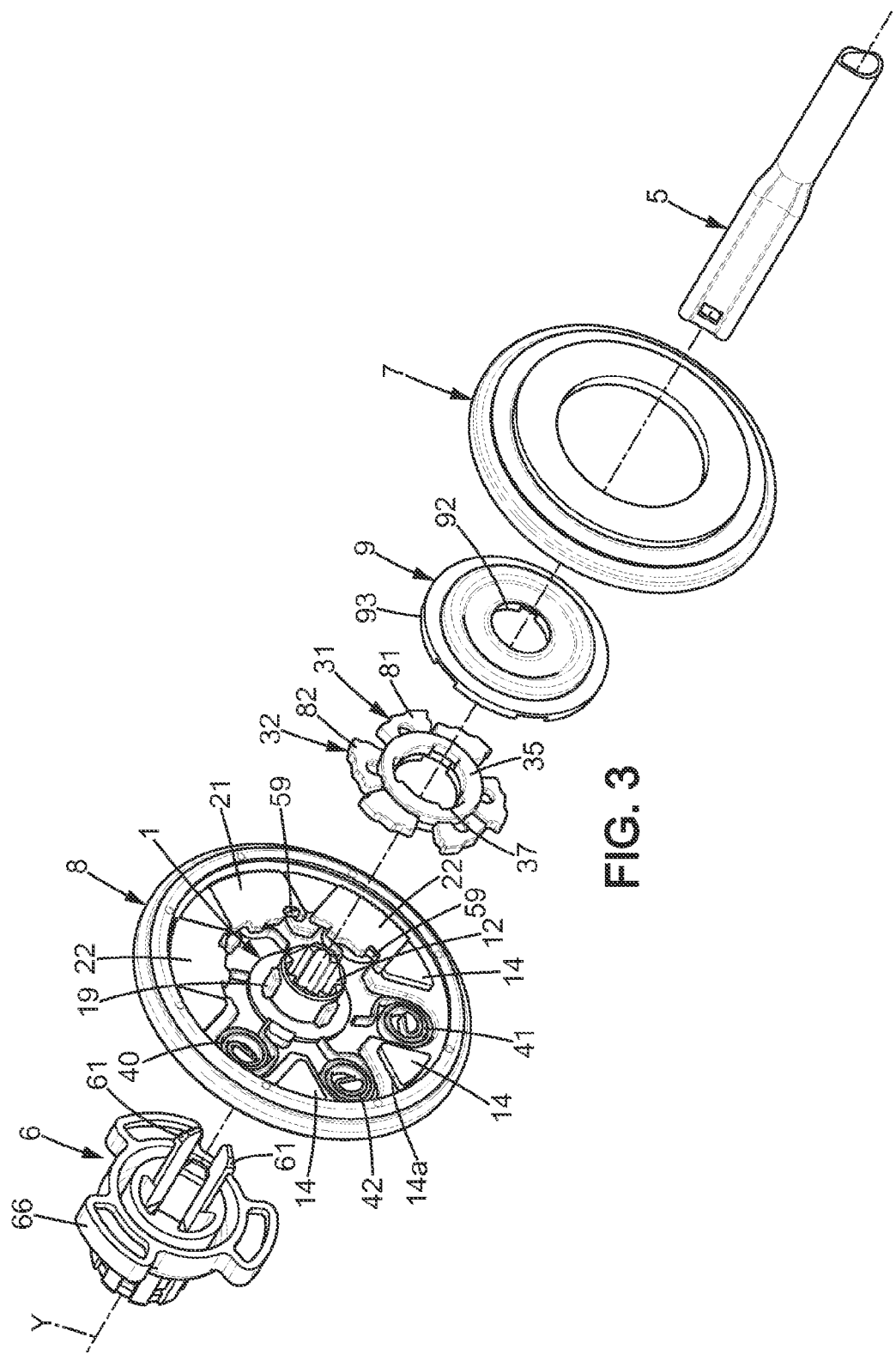
FIG. 3 shows an exploded perspective view of the first hinge mechanism of the device of FIG. 2, according to a first embodiment.
Figure 4:
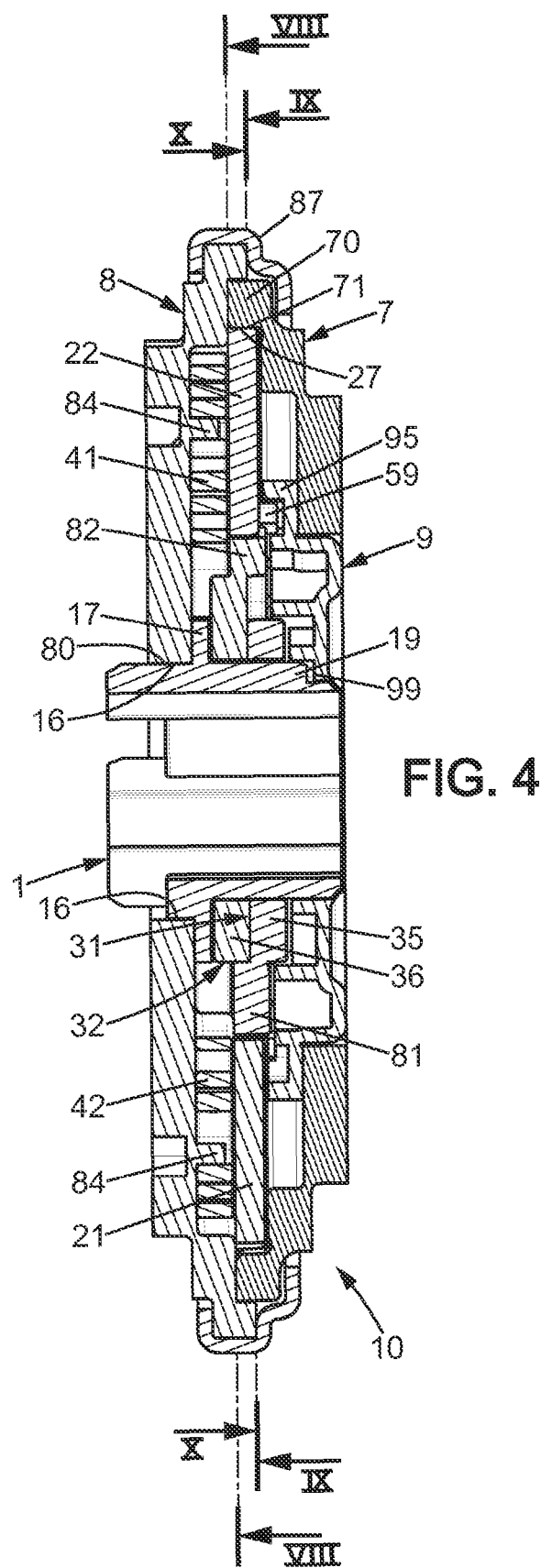
FIG. 4 is an axial sectional view of the hinge mechanism according to the first embodiment.

As illustrated in FIGS. 2,3, a connecting rod 5 is optionally provided, preferably of metal, to connect the two hinge mechanisms 10,20 (see below).

Once assembled, the three parts which are the inner hub 1, the outer hub 6, and the connecting rod 5, form an integral whole here referred to as the "control shaft", immobilized axially due to the inner hub being imprisoned within the hinge mechanism, but with a degree of angular freedom relative to the first and second control cams 31,32.

The outer control hub 6 comprises three stop lobes 66 provided to cooperate with stops (not shown) of the frame that is connected to the second plate. The outer hub 6 also comprises flexible snap-fit tabs 61 which extend in the axial direction Y, and which are provided to clip into rectangular grooves 12 formed in the central aperture of the inner hub 1.

It is important to note, although this case is not shown in the figures, that a single hinge mechanism 10 can be used to implement the present invention, without no connecting rod as such.

When the connecting rod 5 comprises a cylindrical tube centered on Y with triple lobes at each end, as represented, each lobe 54 is designed to fit into a concave recess 18 of the inner hub 1, in particular to drive the rotation.

The hinge mechanism function will now be described with reference to the figures. At rest, the control shaft is in the rest position, denoted $\alpha 0$ (FIG. 9), without any action applied to the control cams, due to the presence of angular clearance $\theta$ ('dead' travel). When the user actuates the handle 103 (in the clockwise direction in the example illustrated), the control shaft pivots to position $\alpha 1$ (actuating position) where it firstly comes into contact with the control cam (first or second) corresponding to the set of locked elements.

Figure 8:
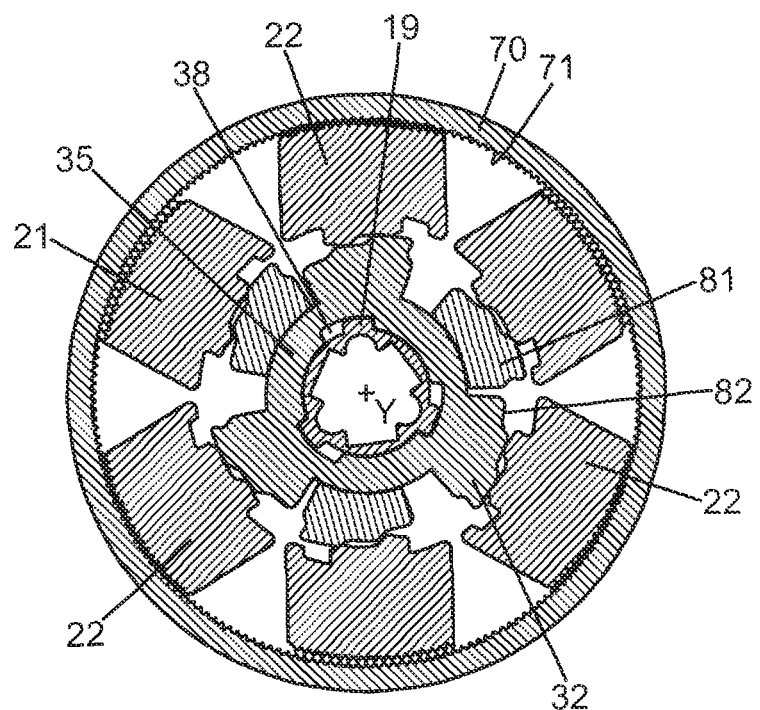
FIG. 8 is a partial cross-sectional view of the hinge mechanism in the locked position, locked by the second set of locking elements, along line VIII-VIII of FIG. 4.

As illustrated in FIG. 8, the driving fingers or stubs 19 of the inner hub then come into contact with the edge of the notches 38 of the second cam, rotating said cam and releasing the engagement of the second elements. As the rotation continues, the inner hub 1 then actuates (position $\alpha 2$) the first control cam 31 which has not completely returned to the locking position (the first elements are tooth on tooth). In parallel, during the same movement, under the effect of the ramp 95 shapes of the control plate 9, the six locking elements 21,22 are pulled radially inward which completely frees the first and second plates 7,8 to rotate freely relative to one another, in other words to adjust the backrest position.

One will note that the resistant force is progressive along the angular path travelled; during the dead travel only the third springs 40 oppose the force applied by the user, they are then supplemented by the second springs 42 during the next portion of the travel, and finally the forces of the first springs 41 are added on when the two cams are pushed into the unlocking position (FIG. 10).

The dead travel $\theta$ is typically chosen to be between 3° and 10°. If the second hinge mechanism 20 is present, the first, second, and third springs together oppose the user force exerted for the second portion of the travel. For the second hinge mechanism 20, the dead travel $\theta'$ may be slightly different than $\theta$, but there is an angular offset which ensures that the two hinge mechanisms are appropriately locked when the control shaft returns to the rest position.

Figure 9:
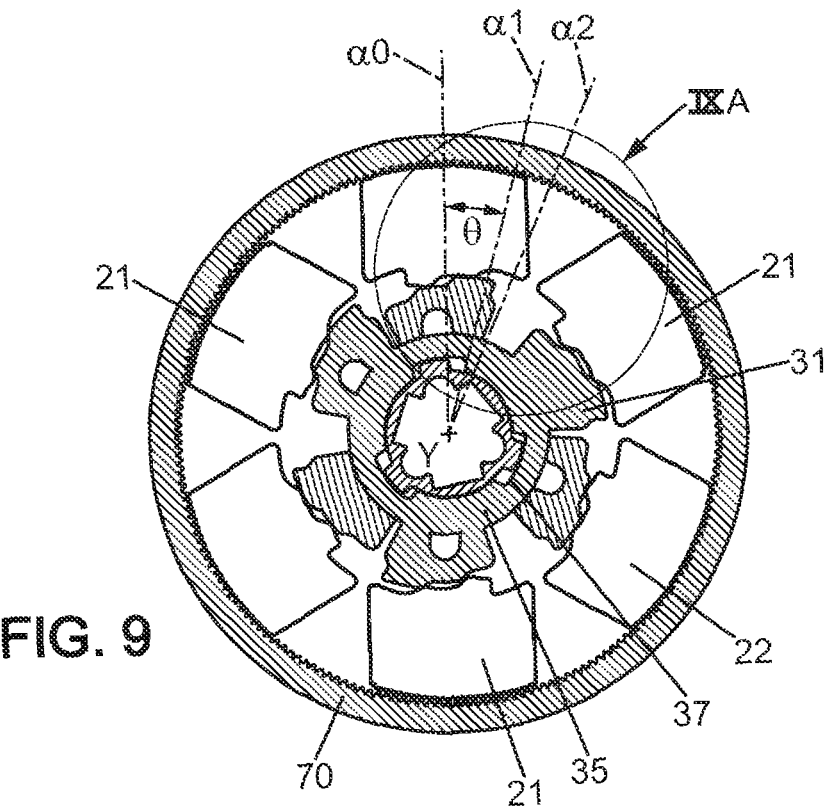
FIG. 9 is a partial cross-sectional view of the hinge mechanism in the locked position, locked by the second set of locking elements, along line IX-IX of FIG. 4.
Figure 9A:
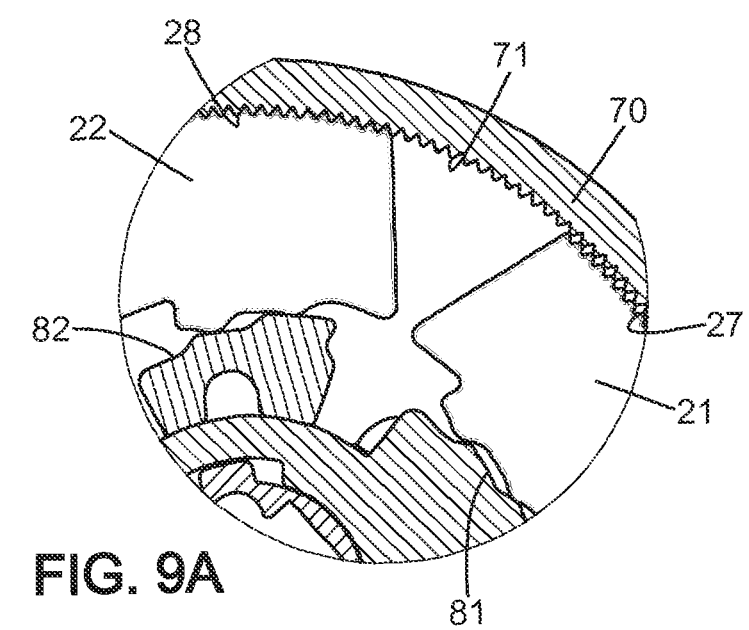
FIG. 9A is a more detailed view of a portion of FIG. 9, according to the first embodiment.

When the user stops applying force to the control shaft, the first and second springs bias the cams toward their locking position (counterclockwise in the example illustrated) and therefore they tend to push the locking elements toward the engaged position. However, as already mentioned, only one of the sets of elements among the two sets will be in a more favorable position for engagement with the base gear teeth 71. Therefore, the set of elements in the most favorable position (the second in the example illustrated) engages the base gear teeth, while the other set of elements remains in a tooth-on-tooth position (FIG. 9A). In addition, the control shaft returns to its rest position due to the effect of the third springs 40, at a distance from the actuating positions of the first and second cams.

With regard to assembly, the inner hub 1 is integrated with the hinge mechanism itself, and is axially immobilized by the flange 17 because it is sandwiched within the stack of the first plate 7, control plate 9, first cam 31, second cam 32, and second plate 8, all enclosed by the crimped outer ring 87.

To assemble the control shaft, the control rod 5 is threaded through the various axial openings, then the outer hub 6 is clipped on. Tabs 61 equipped with hook shapes clip to the inner hub 1 (grooves 12), and other snap-fitting shapes are received in square holes 55 provided at the end of the control rod 5. The control shaft is therefore assembled manually without tools.

With this assembly, there is no need to provide axial immobilization at the second hinge mechanism 20 when the latter is present.

The second hinge mechanism 20 may be a mirror image of the first hinge mechanism 10 relative to the Y axis, on the opposite side of the seat; it also may contain two sets of elements and two control cams in order to obtain a locking pitch equal to half the pitch of the base gear teeth.

Note that obtaining a locking pitch less than 1° facilitates simultaneously locking the left to right hinge mechanisms, and reduces the risk that one of the two hinges is not securely locked due to a slight angular offset between the left and right hinges.

As illustrated by the second embodiment, the hinge adjustment increment can be further reduced relative to a base pitch of the base gear teeth, as is illustrated in particular in FIGS. 12 to 15. All elements or entities that are not specifically described for this second embodiment are considered to be similar or identical to the elements already described for the first embodiment.

In this second embodiment, we have five (P=5) subsets of elements, each subset comprising a single locking element, respectively denoted 21,22,23,24,25. In this configuration, a single element is completely engaged (the third denoted 23 in the case illustrated in FIG. 12) while the others are partially engaged or in the tooth-on-tooth configuration.

Figure 12:
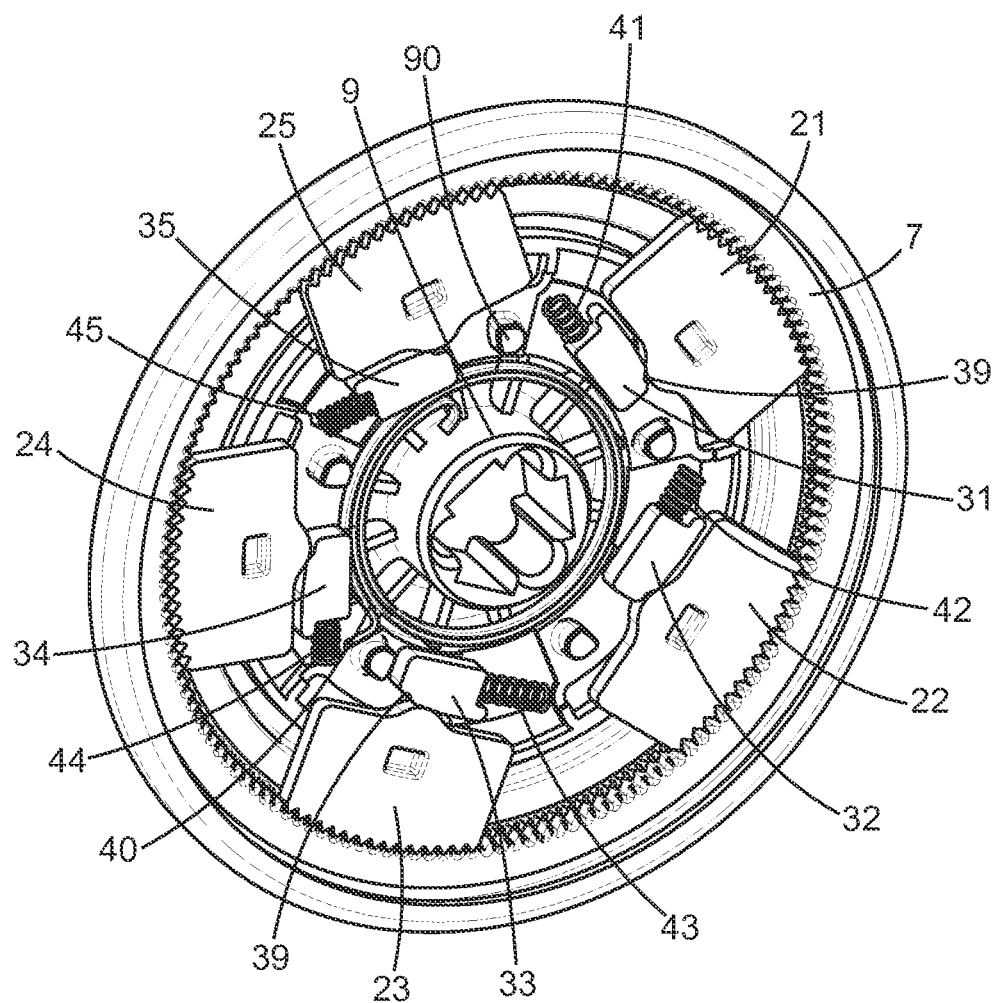
FIGS. 12 to 15 represent a second embodiment.
Figure 13:
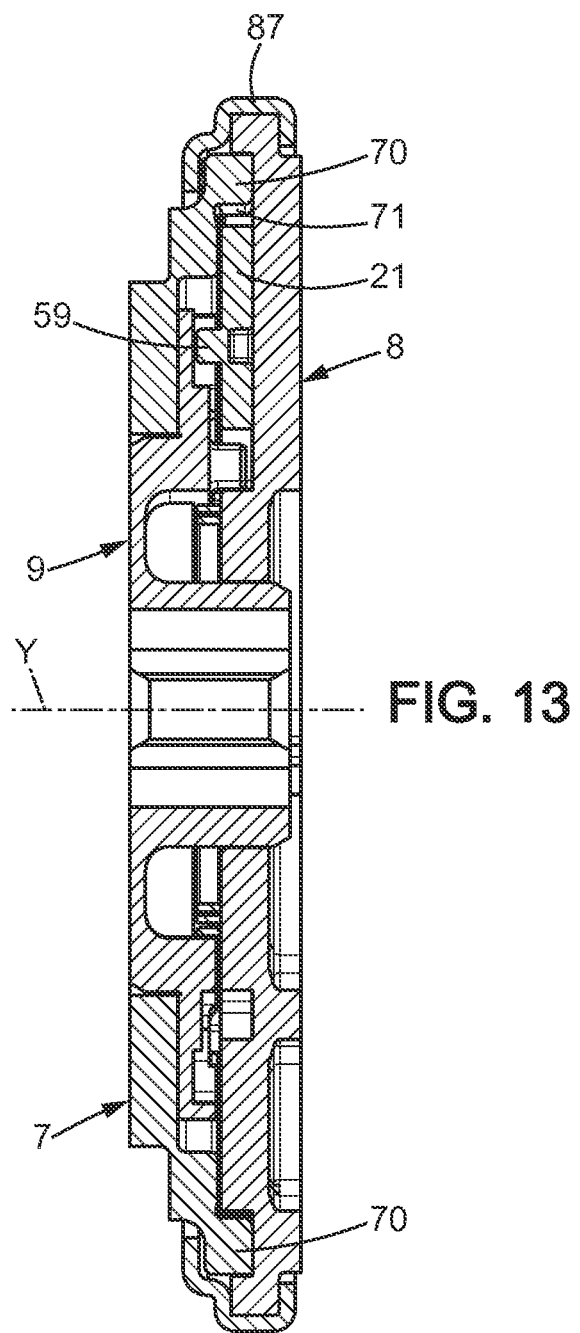

The control cams are formed by metal wedges guided in a tangential direction by recessed shapes 95 in the second plate 8; one will note that here the metal wedges act as the ring-shaped cams of the first embodiment, but here there is an individual cam for each of the locking elements. The first cam 31 acts on the first element 21, and similarly the other control cams 32-35 respectively act individually on the other elements 22-25 (FIG. 12).

More specifically, in the example illustrated, the cams have an external shape that is generally parallelepiped, with a cut face 39 which acts as a cam or wedge.

Each metal wedge 31-35 is independently biased by an individual spring 41-45; in the example illustrated, this is a compressed spring which presses on one end against the bottom 86 of a housing 85 and at the other end against the back 30*b* of the metal wedge.

In the illustrated example, the return springs 41-45 are small compressed coil springs pushing the locking wedges rectilinearly in a tangential direction.

Figure 14:
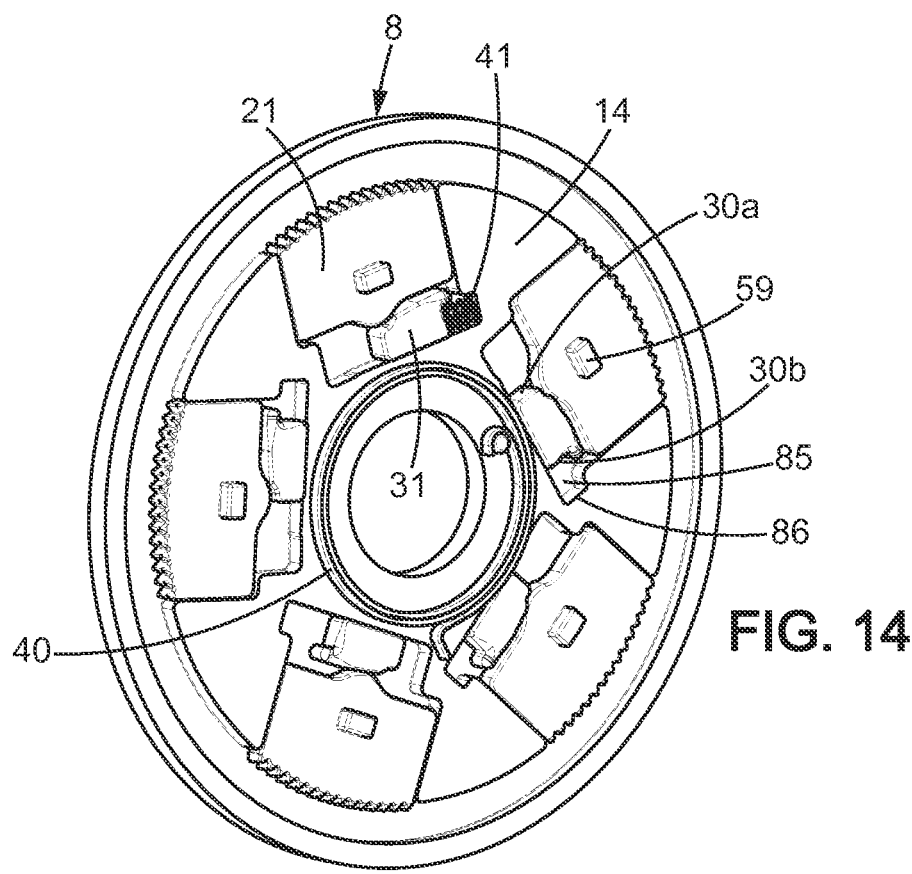
Figure 15:
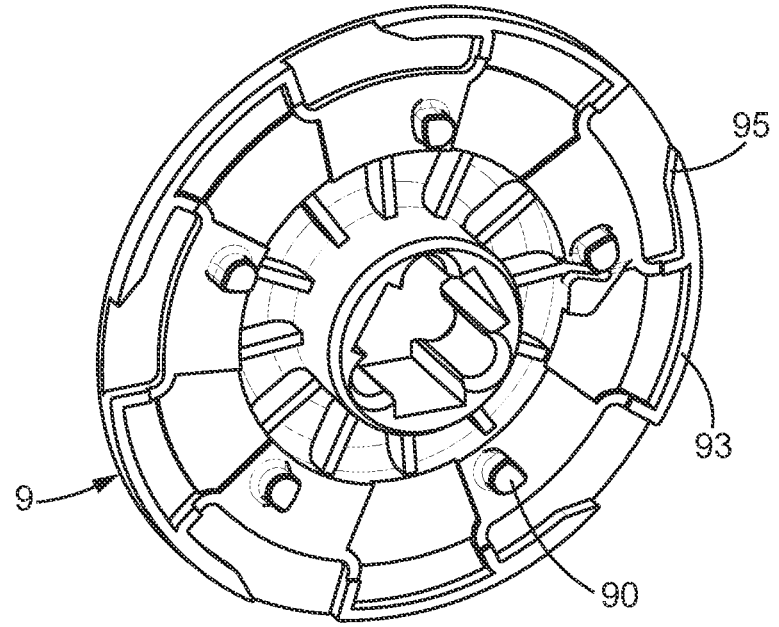

In FIG. 14, only the first return spring 41 is represented; for clarity, the other return springs 42-45 of the locking cams are not shown.

The control hub 1 is simply formed by the plastic control plate 9 which has axially projecting lugs 90, each of these lugs being respectively adapted to push each locking wedge against its return spring. More specifically, the lug 90 presses against the front face 30*a* of the wedge.

In the example shown, the teeth of two consecutive toothed elements are separated by an angular distance of 72 degrees, and the base gear teeth 71 comprise N teeth, N not being a multiple of five, for example 192 or any other value within the ranges 151-154, 156-159, 161-164, 166-169, etc.

N is preferably selected to be a multiple of five, plus or minus 1, for example 189 or 186 teeth, in order to obtain a possible adjustment increment equivalent to dividing the base gear teeth increment by five.

One will note that the housings 86 for guiding the locking cams 31-35 are provided directly by shapes in the second plate 8 of the hinge, in the same plane as the guides 14 which define the movement of the locking elements 21-25.

As for the operation of such a hinge according to the second embodiment, it is understood that when starting from a position where one of the elements is engaged and force is applied to the handle 103 to change the tilt angle of the backrest, all the elements are biased inward by the rotation of the control plate 9 and the camming action of the ramps 95 which pull the elements via their maneuvering pins 59 then the user releases the handle, and locking is established by the engagement of one of the five elements, not necessarily a element adjacent to the previously engaged element, usually the one that is angularly closest to a fully engaged position.

Of course, the number P of subsets could be 3 or 4. It is possible, for example, to have three subsets (P=3) each having two diametrically opposite toothed elements which can engage simultaneously with the base gear teeth.

It is thus possible to express in a generalized manner the angular offset of the teeth of the toothed elements, by the following formulation: the teeth (27) of the one or more first element(s) are offset angularly about the axis relative to the teeth (28) of the one or more second element(s), by an offset substantially equal to (K+1/P) 360/N degrees, where K is an integer, N is the number of teeth in the base gear teeth 71, and P is the number of subsets of toothed elements.

The number P of subsets may advantageously have a value between 2 and 6 inclusive.

In the case where P=2, each subset may comprise either a single toothed element or two toothed elements, or three toothed elements as illustrated in the first embodiment, or even four toothed elements.

In the case where P=3, each subset may comprise either a single toothed element or two toothed elements.

In the case where P=4, each subset may comprise either a single toothed element or two toothed elements.

In the case where P=5, each subset will comprise one toothed element as shown in the second embodiment.

In the case where P=6, each subset will comprise a single toothed element.

When the subset contains an even number of toothed elements, these elements are preferably arranged in diametrically opposite pairs.

The invention claimed is:

1. A hinge mechanism of a motor vehicle seat, allowing adjustment of the tilt of a seat backrest relative to a seat cushion about a hinge axis, the hinge mechanism comprising:

first and second hinge plates intended to be rigidly connected to said backrest and seat cushion respectively, the first plate comprising base gear teeth on an edge directed radially inward, having N teeth spaced regularly apart at an angular pitch of 360/N degrees, a set of P subsets of toothed elements, including at least:
  a first subset of one or more first elements cooperating with a first control cam biased by one or more first springs,
  a second subset of one or more second elements cooperating with a second control cam biased by one or more second springs, and a control hub adapted to move the first and second control cams toward an unlocking position, while the first and second springs independently bias the first and second cams toward a locking position, the first and second elements being movable at least radially, the first and second elements being guided by guides formed in the second plate, and the first and second elements comprising teeth for engaging with the base gear teeth, the first and second elements being movable between an engaged position where the teeth of the elements are engaged with the facing base gear teeth, and a disengaged position where there is no mutual engagement of the teeth, wherein the teeth of the first element(s) are offset angularly about the axis, relative to the teeth of the second element(s), by an offset substantially equal to (K+1/P) 360/N degrees, where K is an integer.

2. The hinge mechanism according to claim 1, wherein the control hub is biased toward a rest position by one or more third springs.

3. The hinge mechanism according to claim 1, wherein P=2, the first subset of first elements comprises three elements spaced 120° apart from one another, and the second subset of second elements comprises three elements spaced 120° apart from one another.

4. The hinge mechanism according to claim 3, wherein the first and second elements are arranged in the same plane at the same axial position, such that they alternate along the base gear teeth.

5. The hinge mechanism according to claim 3, wherein the first elements are similar to the second elements, except for the teeth of the first elements which are offset by a half-tooth relative to the teeth of the second elements.

6. The hinge mechanism according to claim 3, wherein N is chosen as a multiple of 6.

7. The hinge mechanism according to claim 3, wherein each of the first and second control cams is mounted so as to rotate about the hinge axis and comprises an annular main body and a plurality of radial push tabs, the radial push tabs of the first and second cams being arranged in the same plane at the same axial position as the locking elements, while the annular main body of the first cam is offset axially from the annular main body of the second cam.

8. The hinge mechanism according to claim 7, wherein the plurality of radial push tabs of each of the first and second control cams comprises three push tabs.

9. The hinge mechanism according to claim 1, wherein there are P=5 subsets each comprising one toothed element, the teeth of two consecutive toothed elements being offset from each other by an angular distance of 72 degrees and N not being a multiple of 5.

10. The hinge mechanism according to claim 9, wherein the control cams are metal wedges guided in a tangential motion and biased by compression coil springs.

11. The hinge mechanism according to claim 10, wherein the metal wedges are arranged in a same plane at the same axial position.

12. The hinge mechanism according to claim 11, wherein the compression coil springs are being arranged in the same plane.

13. The hinge mechanism according to claim 11, wherein the control hub is a plastic control plate comprising axially protruding lugs configured to push the wedges when the control plate is rotating toward an unlocking position.

14. The hinge mechanism according to claim 1, wherein there are P=3 subsets, each comprising two toothed elements.

15. The hinge mechanism according to claim 1, wherein an angular clearance ($\theta$) is provided between the rest position ($\alpha 0$) of the control hub and the actuating position of each of the control cams ($\alpha 1$, $\alpha 2$), this angular clearance being greater than 3°.

16. A vehicle seat comprising at least one hinge mechanism according to claim 1.

* * * * *